3,534,948
LANCE HEADS
George R. Wade, Didcot, England, assignor to Esso Research and Engineering Company, a corporation of Delaware
Filed Aug. 22, 1967, Ser. No. 662,419
Claims priority, application Great Britain, Aug. 24, 1966, 38,027/66
Int. Cl. C21c 7/00
U.S. Cl. 266—34    2 Claims

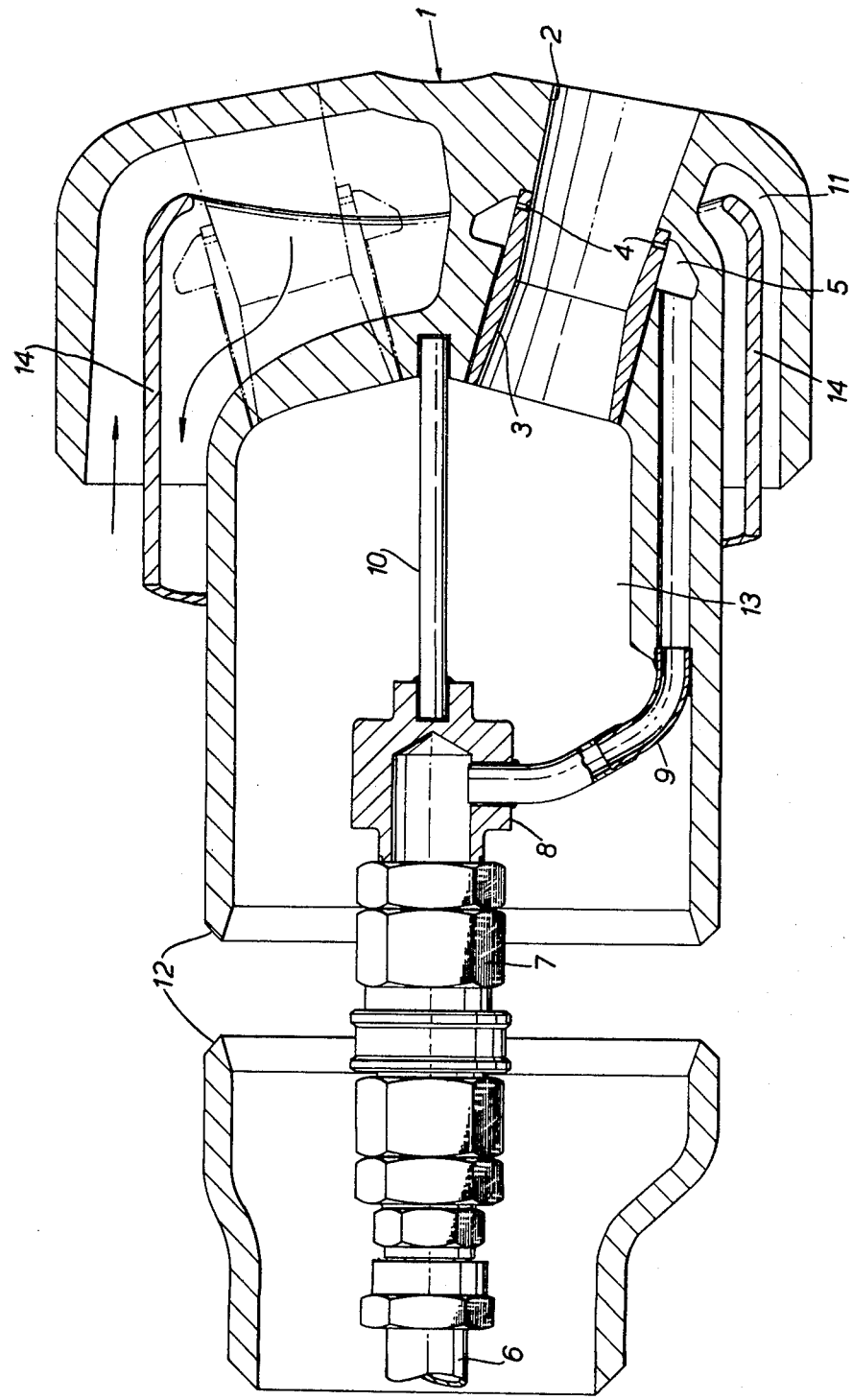

ABSTRACT OF THE DISCLOSURE

A method and apparatus for mixing fuel for use in a metal melting furnace comprising a lance head formed with at least one passageway having a venturi insert disposed therein for the introduction of a liquid or gaseous hydrocarbon into a stream of oxygen whereby it is atomized and intimately mixed with the oxygen. This admixture then is delivered to a furnace wherein scrap metal or the like can be effectively melted.

---

This invention relates to improvements in thermal processes and to an improved lance head for use therein. The invention, although not limited thereto, is particularly applicable to processes for melting scrap metallic material such as scrap steel, especially in a converter.

Thermal processes such as scrap steel melting processes are suitably carried out in L.D. converters in which a comburent, usually oxygen, is delivered through a lance head at high pressure passing through a ventuir near the tip of the lance head which increases the velocity of delivery of the comburent, to a scrap charge in the converter. It is conventional practice to overlay the scrap steel with molten cast iron and the heat of combustion of carbon contained in the molten cast iron when burned with the comburent, combined with the heat of the molten iron itself, melts the scrap steel charge. This process, although it has been used for some time, suffers a number of disadvantages. For one thing the proportion of scrap steel that can be melted, in the scrap steel/molten iron charge, is low, in the region of 25% by weight, being limited by the heat available in the refining process. This proportion can be somewhat increased by pre-heating the scrap steel to about 900° C. prior to placing it in the vessel but this operation not only results in heat losses but also involves considerable technical difficulties. Furthermore, the present refining methods give rise to a high level of fume requiring large investment in cleaning plant to avoid atmospheric pollution.

In the process of the present invention liquid or gaseous fuel, suitably a liquid or gaseous hydrocarbon or hydrocarbon mixture, is introduced to the comburent as it passes through the venturi, and preferably transversely of the stream of the comburent, whereby it is atomised by, and intimately mixed with, the comburent and is delivered in admixture therewith to the charge in the L.D. converter or other thermal process for which it is being used. The fuel may be introduced at one or a number of positions on the circumference of the lance head at the location of the venturi. By introducing a fuel mixture in the manner set forth to a scrap steel charge being melted in a converter, e.g. and L.D. converter, it has been found that the proportion of scrap steel in the scrap steel/molten iron charge may be considerably increased and also, surprisingly, that the amount of fume produced and liable to be vented to atmosphere can be significantly reduced.

An apparatus, suitable for use in the invention, may comprise a lance provided with a central passage for the comburent and jacketed to provide for suitable cooling of the lance head, e.g. a water-circulating jacket. Within the central passage is located a pipe for the delivery of liquid or gaseous fuel, provided with a suitable non-return valve and furnished with one or more feed pipes each of which delivers fuel to an inlet or inlets at the venturi in the comburent passage. Although one passage and venturi, for comburent, may be empolyed it is preferred to provide a number of venturi passages, leading from the main comburent passage, in the lance head and in this case separate feed pipes will deliver fuel to each venturi either directly or through a ring manifold or an equivalent device.

The invention is further explained by reference to the accompanying drawing which is a longitudinal section through a lance head, in accordance with the invention.

Referring to the drawing, a lance head 1 is provided with one or more unobstructed passages 2 in each of which is located a venturi insert 3 suitably inserted by counterboring the jet passage 2. The lower end of the venturi insert 3 is provided with holes 4 communicating with an annular passage 5. The annular passage 5 is in communication with a fuel supply pipe 6 which terminates in a fuel non-return valve 7 and distributor head 8 which distributes fuel through fuel feed pipes 9. The feed pipe assembly may be supported by a strut 10 or an equivalent therefor to relieve the feed pipe or pipes 9 of mechanical load; 11 is a space for the circulation of a cooling medium, generally water, and 14 is a cooling medium flow director.

Differential expansion of the hot fuel pipe 6 and relatively cold body 12 is accommodated through a conventional sealing arrangement (not shown). The comburent passes through the passage 13.

The lance head may be provided with single jet passage 2 or with a number of such passages depending upon the intended application and the size of the lance. It will be understood that mechanical equivalents for various features shown in the drawing may be employed. Thus, instead of a single row of holes 4, a controlled annular gap or several rows of holes for fuel discharge may be provided.

In operation of the device, fuel delivered through the supply pipe 6 passes through one or more feed pipes 9 to the annular passage 5 and is injected through the holes 4 at an angle to the stream of comburent passing through the jet passage, or passages, 2, where it is atomised and intimately mixed with the comburent.

Although reference has been made to the employment of the invention in converter, e.g. L.D. converter, thermal processes, it wil be apaprent that it may be used in other processes, for example in open hearth processes. The invention provides for operation over a wide fuel to comburent ratio so as to provide for low fuel rates, e.g. when fume suppressing and high fuel rates e.g. when preheating the charge. Due to the configuration of the nozzle, the zone of sub-atmospheric pressure in the region of the fuel discharge orifice ensures that there is not a reverse flow of comburent into the fuel delivery pipe or pipes.

Amongst advantages of the lance head of the present invention are the following. It is readily applied to existing equipment and is of simple and robust construction. The discharge jets remain unobstructed and the fuel is discharged into a cool and relatively protected environment and in such manner that intimate and uniform mixing of the fuel and the comburent takes place.

What we claim is:
1. A lance head for introducing a comburent and a fuel to a thermal process comprising a head portion defining at least one passageway having an unobstructed inlet and outlet in communication with the interior of said lance head and the exterior of said head respectively, means for introducing into the interior of said lance head a comburent, venturi means located adjacent said inlet in said passageway for defining a relatively narrow channel, a jacket adapted to receive a cooling medium, said jacket disposed about said head portion, means for introducing a fluid fuel into the interior of said lance head, annular chamber means disposed about said venturi means, conduit means for feeding said fuel into said annular chamber means, inlet means located between said channel and said outlet in communication with the interior of said venturi means and said annular chamber means for introducing said fuel into said venturi means perpendicularly to the direction of flow of the stream of comburent passing from the interior of said lance head through said venturi means.

2. The lance head of claim 1 wherein a plurality of venturi means are provided in said head portion and a fuel manifold means is provided in the interior portion of said lance head for feeding fuel to a plurality of fuel conduit means to each of said venturi means.

References Cited

UNITED STATES PATENTS

| | | | |
|---|---|---|---|
| 1,934,379 | 11/1933 | Rudolph | 239—399 |
| 3,313,535 | 4/1967 | Hopkins | 266—4 X |
| 3,430,939 | 3/1965 | Berry | 266—34 |
| 3,281,136 | 10/1966 | Metz | 266—34 |

FOREIGN PATENTS

| | | |
|---|---|---|
| 1,186,681 | 2/1965 | Germany. |
| 245,188 | 2/1964 | Netherlands. |

J. SPENCER OVERHOLSER, Primary Examiner

J. S. BROWN, Assistant Examiner

U.S. Cl. X.R.

239—434